US009161107B2

(12) United States Patent
Ji et al.

(10) Patent No.: US 9,161,107 B2
(45) Date of Patent: Oct. 13, 2015

(54) SWITCHING FOR A MIMO-OFDM BASED FLEXIBLE RATE INTRA-DATA CENTER NETWORK

(71) Applicant: NEC Laboratories America, Inc., Princeton, NJ (US)

(72) Inventors: Philip Nan Ji, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 48 days.

(21) Appl. No.: 14/166,350

(22) Filed: Jan. 28, 2014

(65) Prior Publication Data

US 2014/0212135 A1 Jul. 31, 2014

Related U.S. Application Data

(60) Provisional application No. 61/757,932, filed on Jan. 29, 2013.

(51) Int. Cl.
*H04J 14/00* (2006.01)
*H04Q 11/00* (2006.01)
*H04L 27/26* (2006.01)
*H04J 14/02* (2006.01)
*H04L 12/931* (2013.01)

(52) U.S. Cl.
CPC ........ *H04Q 11/0066* (2013.01); *H04J 14/0267* (2013.01); *H04L 27/2601* (2013.01); *H04L 49/356* (2013.01); *H04Q 11/0005* (2013.01); *H04Q 2011/0032* (2013.01); *H04Q 2213/13291* (2013.01)

(58) Field of Classification Search
CPC ............ H04J 14/0212; H04J 14/0227; H04Q 11/0005; H04Q 11/0066; H04Q 11/0067; H04Q 11/0071; H04Q 11/02; H04Q 2011/0032; H04Q 2011/0069
USPC .................................. 398/43, 45–57, 58, 66
See application file for complete search history.

(56) References Cited

U.S. PATENT DOCUMENTS

| 7,272,310 | B2* | 9/2007 | Maciocco et al. | 398/47 |
| 7,340,169 | B2* | 3/2008 | Ovadia et al. | 398/57 |
| 2010/0329670 | A1* | 12/2010 | Essiambre et al. | 398/43 |
| 2013/0148963 | A1* | 6/2013 | Cvijetic et al. | 398/45 |
| 2013/0336186 | A1* | 12/2013 | Damnjanovic | 370/311 |
| 2014/0056371 | A1* | 2/2014 | Ji et al. | 375/260 |

OTHER PUBLICATIONS

Kachris et al: "Energy efficient Flexible-Bandwidth OFDM-Based Data Center Network", Cloud Network, Nov. 28-30, 2012.*
Ji et al: "Demonstration of High-Speed MIMO OFDM Flexible Bandwidth Data Center Network", Proceedings of ECOC 2012, paper Th.2.B.1, Sep. 16, 2012.*

* cited by examiner

*Primary Examiner* — Li Liu
(74) *Attorney, Agent, or Firm* — Joseph Kolodka

(57) ABSTRACT

A communication system enabling a switching procedure for a multiple-input multiple-output orthogonal frequency division multiplexing (MIMO OFDM) based flexible rate intra-data center network DCN, includes a MIMO OFDM DCN with optical burst switching OBS capability, an optical burst switching OBS procedure for influencing the MIMO OFDM DCN, and a centralized control configuration coupled to the MIMO OFDM DCN and enabling a software defined network SDN configuration in the communication system.

20 Claims, 6 Drawing Sheets

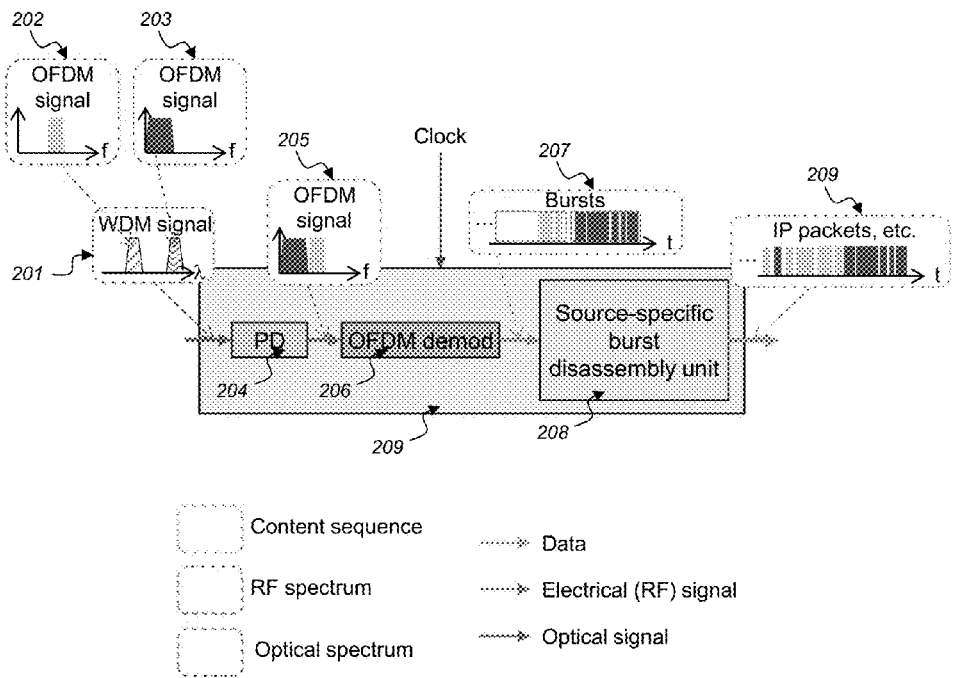
Fig. 6
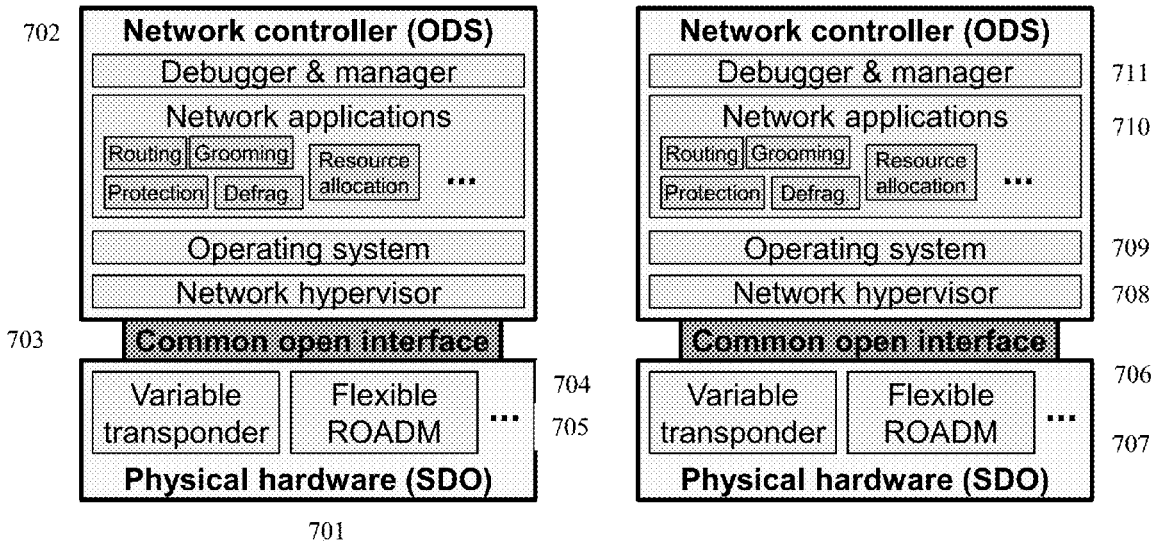
Fig. 11
Fig. 12

SWITCHING FOR A MIMO-OFDM BASED FLEXIBLE RATE INTRA-DATA CENTER NETWORK

RELATED APPLICATION INFORMATION

This application claims priority to provisional application No. 61/757,932, entitled "Switching procedure for MIMO-OFDM-based Flexible rate Intra-Data Center Network", filed Jan. 29, 2013, the contents thereof are incorporated herein by reference.

BACKGROUND OF THE INVENTION

The present invention relates generally to optical networks, and more particularly, to a switching procedure for multiple-input multiple-output-orthogonal-frequency-division-multiplexing (MIMO-OFDM) based flexible rate Intra-data center network.

The following prior documents referenced in the background discussion, not material to patentability of the claimed invention, nevertheless provide additional information.

General Survey of DCN Architectures:
[Kachris] C. Kachris and I. Tomkos, "A Survey on Optical Interconnects for Data Centers", IEEE Communications Surveys and Tutorials, Vol. 14, Iss. 4, pp. 1021-1036, 2012

Inventor's Prior Works on MIMO OFDM DCN:
[Ji1] P. N. Ji, T. Wang, and Y. Aono, "MIMO-OFDM-based flexible rate intra-data center network", NECLA IR 11101;
[Ji2] P. N. Ji, T. Wang, et al., "Demonstration of High-Speed MIMO OFDM Flexible Bandwidth Data Center Network", Proceedings of ECOC 2012, paper Th.2.B.1, 2012;
[Ji3] P. N. Ji, D. Qian, et al., "Design and Evaluation of a Flexible-Bandwidth OFDM-Based Intra Data Center Interconnect", IEEE Journal of Selected Topics in Quantum Electronics (in press)

Background of OBS:
[Qiao] C. Qiao and M. Yoo, "Optical Burst Switching (OBS)—A New Paradigm for an Optical Internet", Journal of High Speed Networks, Vol. 8, Iss. 1, pp. 69-84, 1999
[Chen] Y. Chen, C. Qiao & X. Yu, "Optical Burst Switching (OBS): A New Area in Optical Networking Research", IEEE Journal of Networking, Vol. 8, Iss. 3, pp. 16-23, 2004

Introduction of Intune's OPST Technology:
[Dunne] J. Dunne, "Design Principles for Optical Packet Switch and Transport (OPST) Networks", Intune white paper, 2010

Introduction of Software-Defined Optical Network:
[Ji4] P. N. Ji, "Software Defined Optical Network", Proceedings of 11th International Conference on Optical Communications and Networks (ICOCN 2012), paper THU-07, 2012

As the global Internet traffic growing exponentially, the data centers, which host many Internet application servers, are also facing rapid increase in bandwidth demands. In recent years, large-scale data centers continued to be built out. Due to emerging applications such as cloud computing and "Big data" processing, next generation data centers need to achieve low latency, high throughput, high flexibility, high re-source efficiency, low power consumption, and low cost. Furthermore, as more and more processing cores are integrated into a single chip, the communication requirements between racks in the data centers will keep increasing significantly. By integrating hundreds of cores into the same chip (e.g. Single-chip Cloud Computer) we can achieve higher processing power in the data center racks. However these cores require a fast and low-latency interconnection scheme to communicate with the storage system and the other servers inside or outside of the rack. This communication network between racks is referred to as the intra-data center network, as oppose to the inter-data center network for long distance communication between data centers at different geographical locations. In the following, we focus on the intra-data center network and will thus simply refer it as the data center network (DCN).

Optical technology has been adopted in DCN due to its high bandwidth capacity. However, it is mainly used for point-to-point link, while the DCN interconnect is still based on electrical switching fabric, which has high power consumption and limited bandwidth capacity. Currently, the power consumption of the data center networks account for 23% of the total IT power consumption. However, due to the anticipated high communication requirements in the future, it is estimated that the DCN will account for much higher percentages of the overall power consumption. Therefore it is expected that data center network may evolve to all-optical networks, similarly to the telecommunication networks that have been evolved from opaque to transparent networks using all-optical switches.

In recent years, several hybrid optical/electrical (O/E) or all-optical interconnect schemes for DCN have been proposed [Kachris]. Many of them rely on large scale fiber cross-connect (FXC) or multiple wavelength-selective switches (WSS), which are costly and have slow switching speed (at millisecond level). Having a large scale FXC also present an undesirable single source-of-failure. A recent work used silicon electro-optic mirroring WSS and semiconductor optical amplifier-based switch to achieve nanosecond scale switching, making all-optical packet level routing possible. However the key components are not commercially available and have low scalability. Other architectures use tunable wavelength converters (TWC). They are also costly and do not allow bandwidth resource sharing among the connections. Some of them also require electrical or optical buffers.

In most of these all-optical or hybrid O/E DCN architecture designs, the switching is performed at the circuit level because the optical switch hardware is not fast enough to process IP packets (which is the main type of traffic in data centers). This is called optical circuit switching (OCS). This limitation makes the optical DCN solution less efficient and thus less attractive. Some hybrid O-E architectures use the optical switching portion only for large volume, slow varying traffics, and still rely on the electrical portion for regular IP traffics. Having both types of switching hardware in a DCN requires high equipment cost and cannot solve the high power consumption problem in electrical switching DCN.

Recently we proposed and experimentally demonstrated a novel all-optical DCN architecture that combines a passive cyclic arrayed waveguide grating (CAWG) core router with orthogonal frequency division multiplexing (OFDM) modulation and parallel signal detection (PSD) technologies [Ji1, Ji2, Ji3]. FIG. 1 is the schematic of the DCN architecture. The architecture achieves fast switching (nanosecond speed capable) with low and uniform latency (single hop), low power consumption, and multiple-input multiple-output (MIMO) switching capability, while allowing fine granularity bandwidth sharing (at Mb/s level) and having low cost (does not require any FXC, WSS, or TWC). We also proposed and analyzed various subcarrier allocation algorithms to efficiently use the bandwidth resource and optimize the throughput in the DCN.

However, the MIMO-OFDM DCN research so far is on physical layer hardware implementation, as well as subcarrier allocation algorithm. There is no control system to utilize them in practical DCN application. Furthermore, despite the high switching speed capability, the work so far is based on circuit switching only. In other words, there is no solution to enable packet switching in this DCN architecture.

Optical packet switching (OPS) has been studied for many years to enable packet switching function in the optical domain, because it will provide better flexibility, efficient resource utilization, potential functionality and finer switching granularity. Some OPS prototype systems have been built and demonstrated. However, OPS is not efficient because in OPS the data payload must wait in the optical buffers before it can be forwarded to the next node since the packet header needs to be processed either all-optically or electronically after an optical-to-electrical (O-E) conversion at each intermediate node. And there are many major challenges for it to be solved before OPS can be practical enough for actual application. For example, there is no optical equivalent of RAM and logic devices for optical signal processing (such as optical packet header processing). And even if the header is processed electronically, there is no flexible optical buffer with practical buffering capability currently available (a less flexible alternative, namely the fiber delay line, is currently used in the OPS research testbeds), and the optical switching hardware at packet speed level is still very expensive and large.

A good compromise between OCS and OPS is optical burst switching (OBS) [Qiao, Chen]. In an OBS network, various types of client data (including asynchronous traffics such as Ethernet, and synchronous traffics such as SONET, SDH, OTN, Fiber Channel, FICON . . . ) are aggregated at the ingress (an edge node) and transmitted as data bursts (FIG. 2(a)) which later will be disassembled at the egress node (FIG. 2(b)). During burst assembly/disassembly, the client data is buffered at the edge where electronic RAM is cheap and abundant. Even though the client data go through burst assembly/disassembly only at the edge of an OBS network, nevertheless, statistical multiplexing at the burst level can still be achieved in the core of the OBS network.

Another feature of OBS is that data and control signals are transmitted separately on different channels or wavelengths, as illustrated in FIG. 3. For each data burst, a control packet containing the usual "header" information (such as the burst length information) is transmitted on a dedicated control channel. Since a control packet is significantly smaller than a burst, one control channel is sufficient to carry control packets associated with multiple (e.g., hundreds of) data channels. A control packet goes through OEO conversion at each intermediate OBS node and is processed electronically to configure the underlying switching fabric. There is an offset time between a control packet and the corresponding data burst to compensate for the processing/configuration delay. For multi-hop network, the offset time at each hop is different, as illustrated in FIG. 3. If the offset time is large enough, the data burst will be switched all-optically and in a "cut-through" manner, i.e., without being delayed at any intermediate node (core). In this way, no optical RAM or fiber delay lines is necessary at any intermediate node. This is an advantage over OPS. Furthermore, it allows a lower control overhead per bit than that in OPS. In OBS, costly OEO (optical to electrical to optical) conversions are only required on a few control channels instead of a large number of data channels. Compared to OCS, the burst-level granularity leads to a statistical multiplexing gain and thus more efficient use of the bandwidth, which is absent in OCS.

Therefore OBS presents a good solution for DCN because it combines the advantages of optical switching (low power consumption, high capacity) and the advantage of sub-wavelength switching (statistical multiplexing gain, better bandwidth utilization) in a practical way.

So far, there is only one carrier grade OBS architecture and product in the world. This is developed by Intune Networks. The technology is called the Optical Packet Switch and Transport (OPST) and is based on their fast tunable optical transmitters [Dunne]. Despite what the name (which includes "optical packet switch") suggests, the OPST is actually a type of OBS technology. In fact, it was claimed to be "the world's first carrier grade OBS architecture". In such architecture (FIG. 4), every node is attached to the OPST fabric (ring) through a fast tunable laser (with nanoseconds tuning speed) and a burst mode receiver (BMR) under that port's local control. Each receiver node is assigned a unique wavelength in which every other node can transmit to this node by tuning the transmitter in real-time. At each BMR, the ingress packets are queued by class of service per wavelength. Each port can send and receive frames to and from all other ports, providing a fully distributed switching capability with no intervening OEO between source and destination.

Intune's OPST architecture is most suitable for shorter distance networks (up to a few hundreds of kilometers). Although it is advertised mainly for transport networks, it could be also used to replace the core network of the data centers [Kachris].

There are several limitations to this OPST architecture. For example, due to its ring topology, it is difficult to inset new nodes without interrupting the existing traffics, because even though each node has its own dedicated wavelength, all wavelengths are transmitted within the same fiber using wavelength division multiplexing (WDM). Therefore in-service upgrade cannot be achieved. Secondly, at the receiver of each node, a passive optical coupler is used to combine all the signals from all other nodes. If the coupler has large port count to accommodate all existing and potential future nodes, the optical loss will be very large. On the other hand, if the port number of the coupler is limited to a certain quantity, the number of nodes that can simultaneously transmit to the particular destination node will be limited too. Therefore this architecture is not very scalable. So far the product can support only up to 16 nodes in a ring, which is not sufficient for regular data centers. Thirdly, the ring topology also leads to the fact that different source-destination pairs go through different numbers of hops (one hop is between two adjacent node), such as the yellow traffic vs. the red traffic in FIG. 4, making the propagation delay uneven, and thus the latency is also not uniform.

Accordingly, there is a need for a switching procedure for MIMO-OFDM based flexible rate intra-data center network that overcomes the shortcomings of prior efforts.

BRIEF SUMMARY OF THE INVENTION

The present invention is directed to a communication system enabling a switching procedure for a multiple-input multiple-output orthogonal frequency division multiplexing (MIMO OFDM) based flexible rate intra-data center network DCN, the system including a MIMO OFDM DCN with optical burst switching OBS capability, an optical burst switching OBS procedure for influencing the MIMO OFDM DCN, and a centralized control configuration coupled to the MIMO OFDM DCN and enabling a software defined network SDN configuration in the communication system, wherein the MIMO OFDM DCN provides optical burst handling functions to allow efficient sub-wavelength level switching of packets, and add the communication channels with the centralized controller, the modified OBS procedure providing burst assembling and wavelength division multiplexing WDM OFDM signal generation that are operable concurrently not on the same signal; and the software defined network SDN configuration enables, if the WDM OFDM generation hardware is modified or upgraded in the future, the control software does not need to be changed and the same control commands can be used through the open interface and network operator changes to control by the SDN capability or apply new features, only new software need be applied without hardware modification.

In an alternative expression of the invention, a method in a communication system for enabling a switching procedure for a multiple-input multiple-output orthogonal frequency division multiplexing (MIMO OFDM) based flexible rate intra-data center network DCN, the method including providing optical burst switching OBS capability with a MIMO OFDM DCN, influencing the MIMO OFDM DCN with an optical burst switching OBS procedure; and enabling a software defined network SDN configuration in the communication system with a centralized control configuration coupled to the MIMO OFDM DCN, wherein the MIMO OFDM DCN provides optical burst handling functions to allow efficient sub-wavelength level switching of packets, and add the communication channels with the centralized controller, the modified OBS procedure providing burst assembling and wavelength division multiplexing WDM OFDM signal generation that are operable concurrently not on the same signal; and the software defined network SDN configuration enables, if the WDM OFDM generation hardware is modified or upgraded in the future, the control software does not need to be changed and the same control commands can be used through the open interface and network operator changes to control by the SDN capability or apply new features, only new software need be applied without hardware modification.

These and other advantages of the invention will be apparent to those of ordinary skill in the art by reference to the following detailed description and the accompanying drawings.

BRIEF DESCRIPTION OF THE DRAWINGS

FIG. 6 is a diagram show details of a WDM OFDM optical burst receiver, in accordance with the invention;

FIG. 11 is a diagram showing structure of software-defined optical network for optical transport; and FIG. 12 is a diagram showing structure of software defined optical network for a data center

DETAILED DESCRIPTION

The present invention includes multiple components: a modified OBS control procedure, a centralized control architecture that offers the benefit of software-defined network (SDN), and a corresponding hardware design to support such architecture and control procedure. All these components enable the inventive MIMO-OFDM DCN architecture to have practical application and optimized performance.

This invention is about the extension and operation of the MIMO-OFDM-based flexible rate DCN, which was our prior invention [Ji1] This current invention contains 3 major components: (I) A modified MIMO OFDM DCN with burst switching capability; (II) A modified OBS control procedure specially designed for this MIMO OFDM DCN architecture; and (III) A software-defined DCN architecture. These 3 invention components work together in this new DCN application.

(I) A Modified MIMO OFDM DCN with Burst Switching Capability

The first component is the physical hardware for the DCN. It is the modified/extended MIMO OFDM DCN with burst switching capability. It mainly consists of WDM OFDM optical burst transmitters, WDM OFDM optical burst receivers, a passive switching core, and a centralized controller. The main modifications in this invention are in the WDM OFDM optical burst transmitters and the WDM OFDM optical burst receivers.

The WDM OFDM optical burst transmitter is an expansion of the WDM OFDM transmitter proposed in our prior invention "MIMO-OFDM flexible rate intra-data center network" [Ji1]. Same as the prior art, this modified transmitter also receives the aggregated signals from the top-of-the rack switch (ToR) at each data center server rack and generates a WDM OFDM signal. In this generated output signal, different wavelengths go to different destination racks according to the cyclic periodic wavelength arrangement of the CAWG, and each WDM channel is modulated using OFDM format where the OFDM subcarriers are assigned dynamically to share the bandwidth resource among different source racks that are transmitting to the same destination rack. In this invention, we add the optical burst handling functions to allow efficient sub-wavelength level switching of packets, and add the communication channels with the centralized controller.

Figure 5:
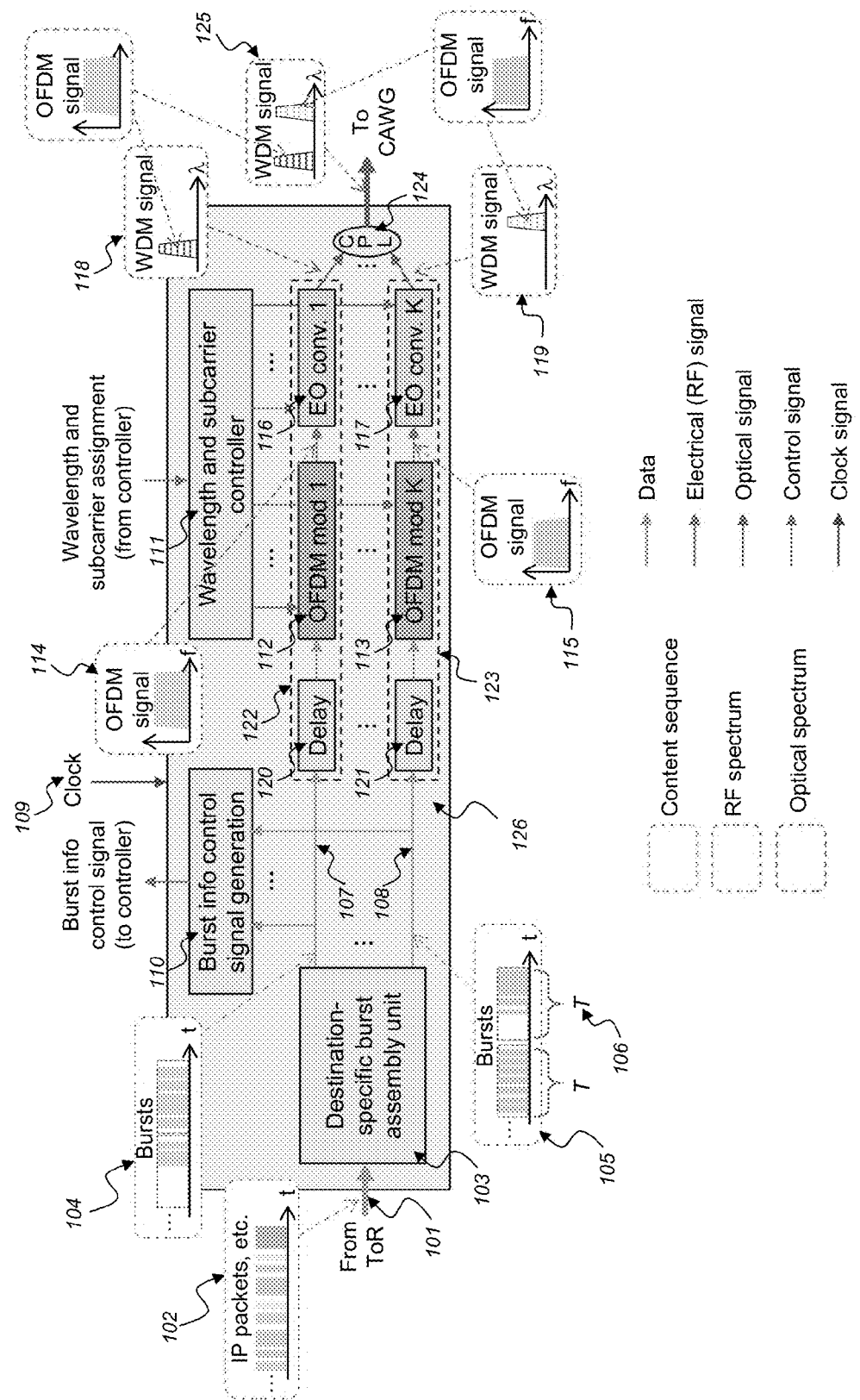
FIG. 5 is a diagram of a WDM OFDM optical burst transmitter, in accordance with the invention.

FIG. 5 shows the schematic of the new WDM OFDM optical burst transmitter. The input (101) is the data from a ToR switch in a server rack, which contain the aggregated inter-rack traffic from all the servers in this rack (102). This input data is processed by a burst assembly unit (103), where packets (or other types of traffics) are assembled into bursts (e.g. 104, 105). Different types of assembly algorithms can be used, such as timer-based, burstlength-based, and mixed timer/burstlength-based [Chen]. For our MIMO OFDM DCN architecture, timer-based assembly (also called fixed duration assembly) is more suitable. In the timer-based scheme, a timer starts at the beginning of each new assembly cycle. After a fixed time T (106), all the packets that arrived in this period are assembled into a burst.

Different from the burst assembly unit in a conventional OBS system, which only has one output burst stream, the burst assembly unit here is destination-specific and can handle multiple destinations simultaneously. It outputs multiple burst data streams (e.g. 107, 108), one for each destination rack (i.e. each destination ToR). Based on the targeted destination information for each packet, the destination-specific burst assembly unit sends it to the respective output. At each output, the burst assembly unit assembles the packets arrived within the assembly cycle time T into a burst. This is also different from the conventional timer-based burst assembly where all packets arrived within the cycle time are assembled into a burst. Here only those sent to the same destination racks are assembled into a burst.

To use the timer-based assembly algorithm in this MIMO OFDM DCN, all ToRs are synchronized through a common clock (109). The assembly procedure will be discussed in more details in the following section.

The formed bursts are then sent to the modulators to generate WDM OFDM signal. The actual setting is determined by the centralized controller of the DCN. After the burst steams are formed by the burst assembly unit, the information of the bursts (such as the destination and the length of each burst) is collected by a burst information control signal generation unit (110) to generate a control signal that contains such burst information. (This control signal generation unit can be physically integrated with the burst assembly unit, but since they perform different functions, they are drawn separately here.) This control signal is sent to the controller through a separate connection. Since the physical location of the DCN racks (and thus the ToRs and the corresponding WDM OFDM optical burst transmitters for each rack) is quite close (less than 2 km, often even shorter), and since the volume of such burst information is small compared to the actual DCN traffics, it is suitable to use basic electrical connections such as dedicated Ethernet links to send such control signal from the transmitters to the centralized controller. Alternatively, we can dedicate an out-of-band optical channel (not within the CAWG wavelength rage) for the control signaling between the centralized controller and all the transmitters, and use time division multiplexing (TDM) or OFDM to share the channel among all racks. The control signal's format can use a common open protocol through the interpretation of an adaptor, which will be discussed later.

The centralized controller will collect all the burst traffic information from the transmitters for all racks, then use CAWG connection information and the target destination information for each burst to decide the wavelength of each burst, and use subcarrier control algorithm to assign appropriate subcarriers for each burst to minimize contention. This signal format can also be a common open protocol through the interpretation of an adaptor (to be discussed later). This respective information is sent to each transmitter (similar to above, it can be via a dedicated electrical connection or a shared TDM or OFDM control channel). This information is received and interpreted by a wavelength and subcarrier controller (111) inside the transmitter, which then sends the OFDM subcarrier assignment information to the OFDM modulators (e.g. 112 and 113) to generate appropriate electrical OFDM signals (e.g. 114 and 115), and configures the wavelength or on-off state of each EO converters (e.g. 116 and 117) to generate WDM OFDM signals (e.g. 118 and 119). Due to the delay from the control signal propagation and the processing time in the centralized controller, a delay (e.g. 120 and 121) is added before the burst reaches the OFDM modulator. Here fixed duration delay is sufficient because the propagation and processing delay values are fixed and known.

In the WDM OFDM optical burst transmitter, there is one set of WDM OFDM generator unit (consist of optical delay, OFDM modulator, and EO converter) (122 and 123) for each burst stream, and they all have different optical wavelengths, according to the CAWG arrangement and destination information (for more descriptions see the previous IR [Ji1]). At the output of the transmitter, an optical combiner (124, coupler or multiplexer) is used to combine these OFDM-modulated signals with different wavelengths into one WDM signal (125) to send to the optical core, i.e. the CAWG.

Same as in the prior invention of the MIMO-OFDM DCN architecture, the EO converter (e.g. 116 and 117) can be either (a) a directly modulated laser (DML) or (b) a continuous wave (CW) laser with an external modulator (such as Mach-Zehnder modulator or electro-absorption modulator). In terms of the tunability, there are 2 schemes. The first scheme is to have N sets of WDM OFDM generator units, where N is the port count of CAWG (or maximum number of ToRs in the DCN, if it is smaller than the total port count of the CAWG, in which case some CAWG ports are unused and can be reserved for future expansion). If we do not consider the loopback scenario where a ToR transmit signal back to its own rack, only N−1 sets of EO converter is needed, but in the following sections we just use the number N for simplicity. In this case, fixed wavelength lasers can be used, and the selection of WDM channels at each transmitter is done by switching each laser on and off, or by turning the modulator on or off (turning modulator off can also be done by applying constant signal to the modulator). This can be achieved in a very fast speed, and each ToR can communicate with all the remaining ToRs in the DCN simultaneously. The disadvantage of this scheme is that it requires large number of EO converters, OFDM modulators, and delays in each transmitter, which is more costly, and the coupler at the transmitter output needs to have high port count, leading to higher optical signal power loss. Optical multiplexer can be used to reduce loss, but the component cost is higher than coupler. Under this scheme, the wavelength of each WDM OFDM generator unit is fixed, therefore it does not require the centralized controller to provide wavelength assignment information. Only the subcarrier allocation is needed for each generator unit.

The second option is to use tunable EO converters whose laser wavelengths are tunable. Therefore we only need to have K sets of WDM OFDM generator units in each transmitter, where 1≤K≤N. This will reduce the hardware cost, size and power consumption. Since this scheme uses tunable lasers to select the wavelength based on the assignment by the centralized controller, the switching speed is thus determined by the laser tuning speed, which is normally slower than laser on/off speed. However, fast tunable laser is available, such as the one used in the Intune Networks' OPST system, and the interleaved rear reflector laser that has nanosecond tuning speed published by University of College Cork in 2010 [Ref 21 of Ji3]. The delay in the WDM OFDM generator unit can take into account the tuning speed to set the appropriate delay level. Another potential issue of this scheme is that if in some occasions the source ToR needs to communication with more than K destination ToRs at the same time, some of the traffic requests need to be delayed or go through indirect link due to insufficient WDM OFDM channels from this transmitter.

As for the WDM OFDM optical burst receiver end (FIG. 6), parallel signal detection (PSD) technology is used to simultaneously receive the WDM signal (201) that carriers all OFDM subcarriers (e.g. 202 and 203) from all source transmitters that arrive at the receiver through the CAWG wavelength routing using a single photodetector (204), and convert it to a combined electrical OFDM signal (205). And the OFDM demodulator (206) converts the signal back to the data contents (207). So far this is the same as the previous invention [Ji1]. However the difference in this invention is that the obtained data contents (207) are signal bursts from various source ToRs for this destination ToR. These bursts then pass through a source specific burst disassembly unit (208) to disassemble the bursts back to original traffic content (209, such as packets, etc.)

Figure 1:
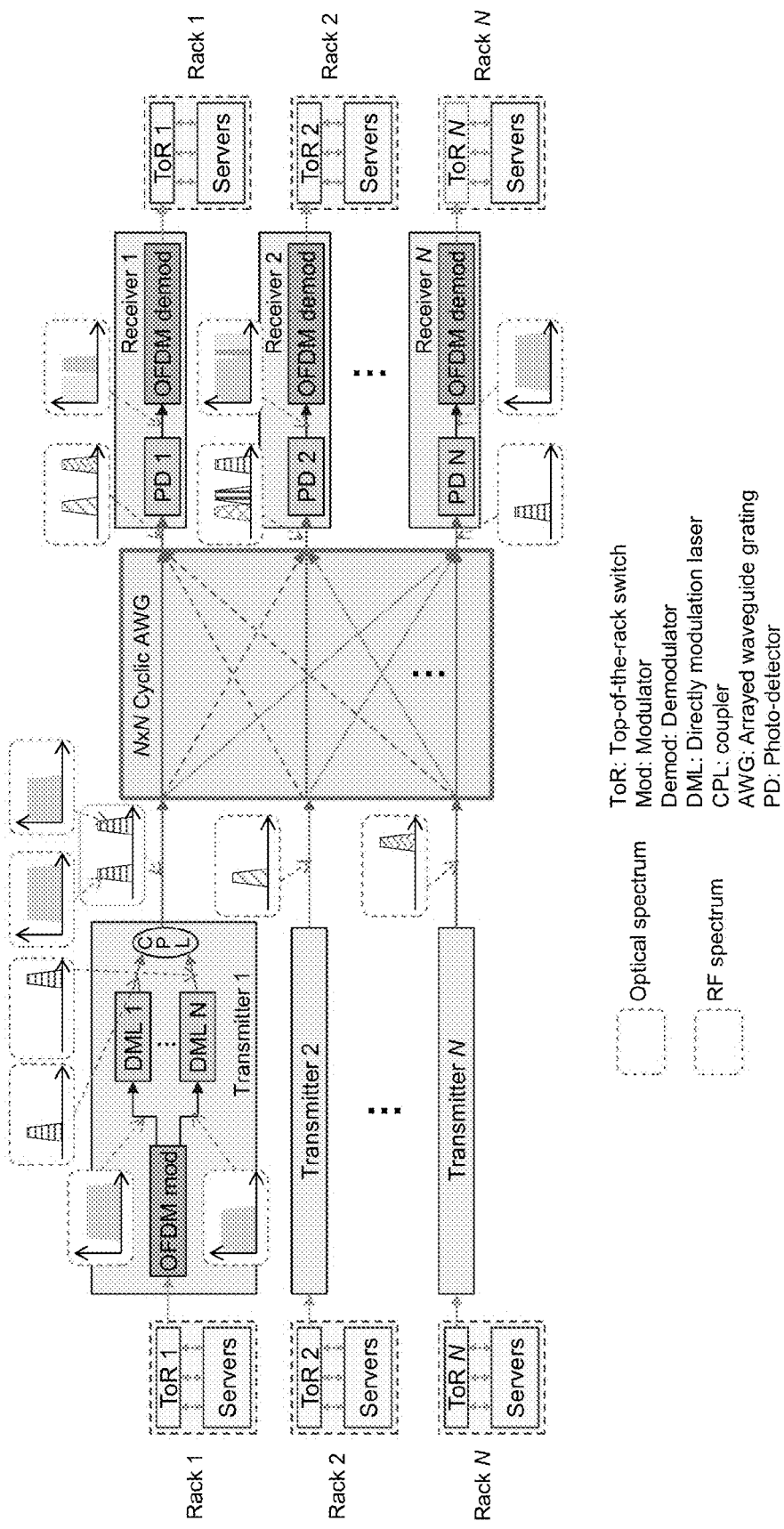
FIG. 1 is diagram of a of a MIMO-OFDM flexible rate DCN configuration.
Figure 2:
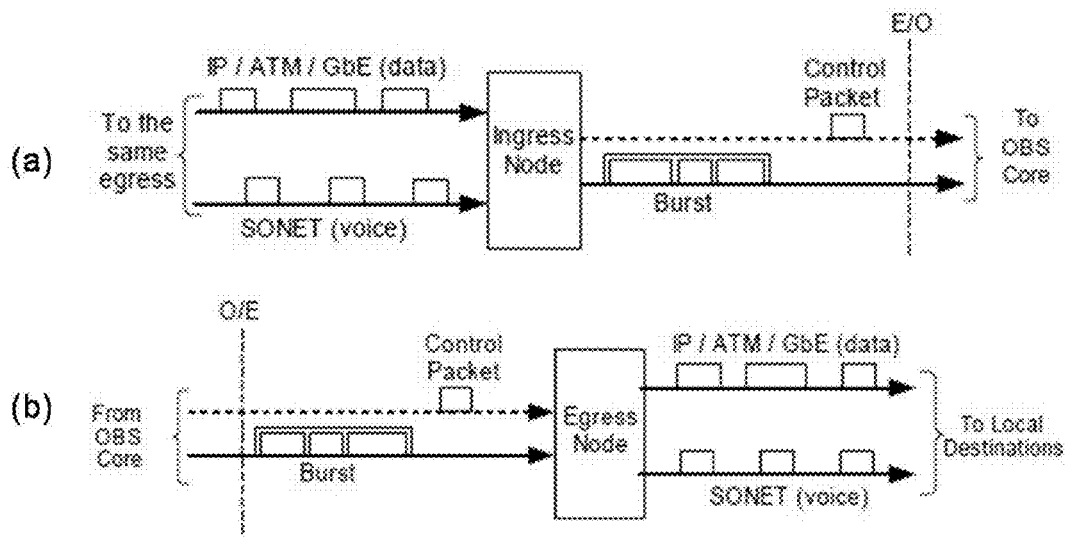
FIG. 2 shows (a) burst assembly and (b) burst assembly at the edge of an OBS network.
Figure 3:
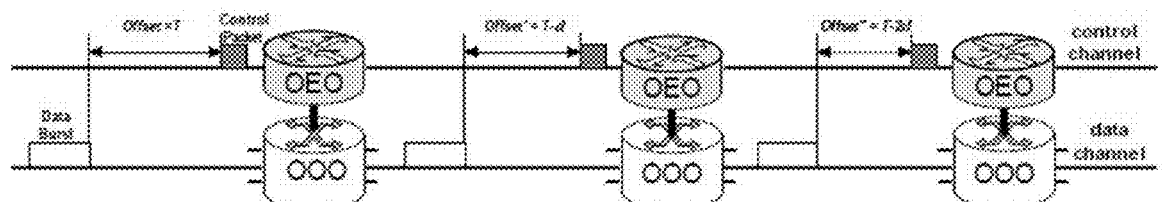
FIG. 3 shows separated transmission of data and control signals in an OBS network.
Figure 4:
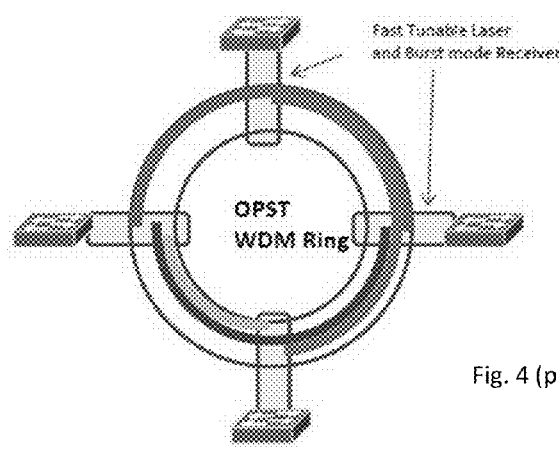
FIG. 4 shows an Intune Networks OPST architecture.
Figure 7:
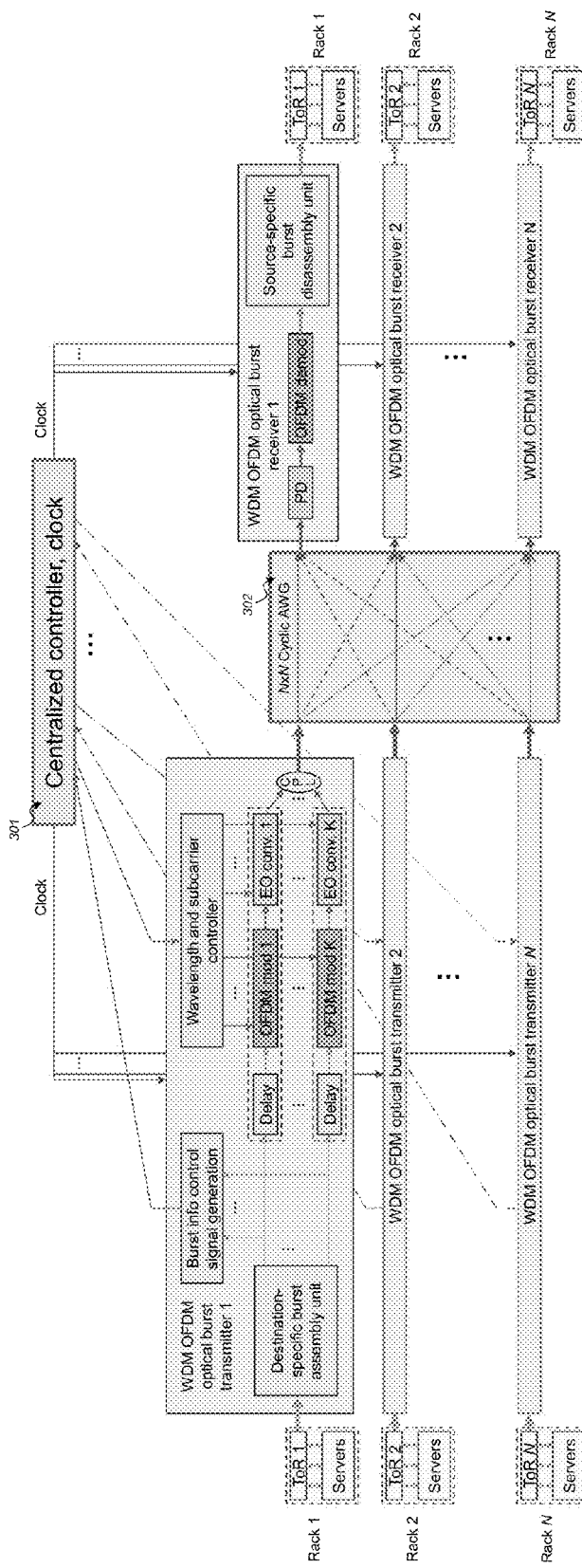
FIG. 7 is a diagram of a MIMO OFDM DCN configuration with a packet burst switching function, in accordance with the invention.

Along with the centralized controller and the CAWG-base optical core, the architecture of the MIMO OFDM DCN with the new packet burst switching function is shown in FIG. 7. Note that the transmitter and receiver for a particular ToR are actually located together physically. They are drawn separately on left and right sides in FIGS. 1 and 7 to make the description easier.

Figure 8:
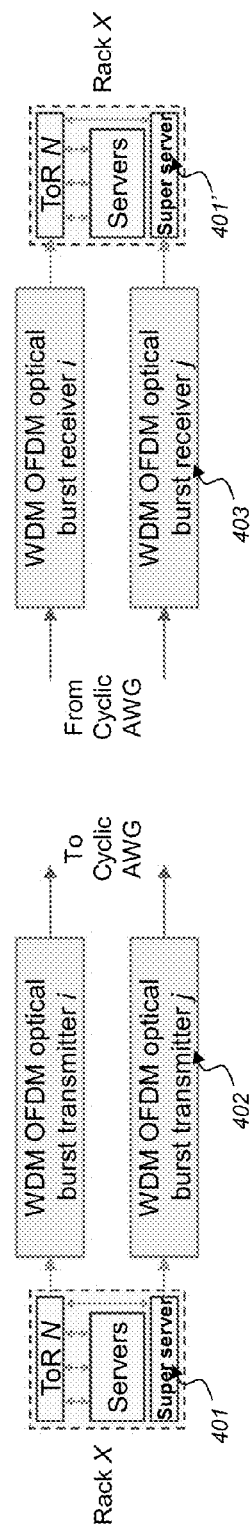
FIG. 8 is a diagram of a super server with dedicated WDM OFDM optical burst transmitter/receiver in accordance with the invention.

As shown in FIG. 7, there is one set of WDM OFDM transmitter and receiver at each ToR. But if some servers in the DCN constantly have large inter-rack communication volumes, it will be less efficient for them to go through the ToR before exiting the rack. In some cases, the large traffic volume from these servers might even congest the ToR. To serve these "super servers" (401) more effectively, the MIMO OFDM DCN architecture can be extended to reserve dedicated WDM OFDM optical burst transmitters/receivers (e.g. 402 and 403) and dedicated CAWG ports for them (FIG. 8). These servers can bypass the ToR and connect to the transmitters directly. (They can still communicate with other servers in the same rack through intra-rack communication connections). For simplicity sake, in this document, "ToR" refer to both "regular ToR" and "super server".

Because of the architecture design, this DCN solution does not have the limitations of the OPST technology by Intune Networks. For example: (1) Since the source-destination pairs in this architecture are all independent, upgrades (changing the hardware in one transmitter or receiver, or adding a ToR) can performed in-service, i.e. it will not affect the existing traffics in the network. (2) The scalability of this architecture is much better than the OPST architecture. The number of ToR that can be supported here is determined by the CAWG port count, which can be 512 or higher (see discussion in [Ji3]), compared to 16 in the Intune Networks' system. (3) The latency is low and uniform in this architecture, since all signals take exactly one hop, compared to non-uniform, multiple hopes in the ring-based OPST architecture.

(II) Modified OBS Control Procedure

The second major part of this invention is an OBS control procedure/protocol that corresponds to the physical system described above.

Figure 9:
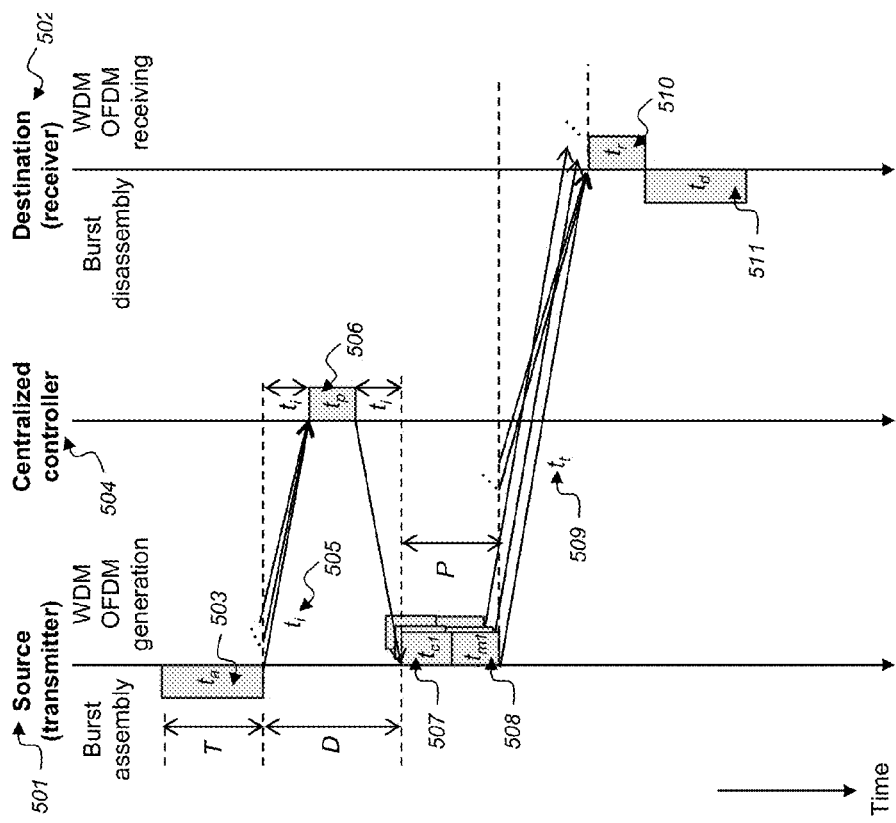
FIG. 9 is a scheduling diagram showing a modified OBS control protocol, in accordance with the invention.

The scheduling diagram for such protocol is shown in FIG. 9. Here the source (WDM OFDM optical burst transmitter, 501, same as 126 in FIG. 5) performs two main functions, burst assembling and WDM OFDM signal generation (including modulation and transmission). These two functions are performed by different hardware components, therefore they can be operated concurrently (but not on the same signal). They are illustrated on two different sides of the source's time axis. Similarly, the WDM OFDM optical burst receiver (502, same as 209 in FIG. 6) at the destination performs WDM OFDM receiving and burst disassembly functions concurrently at different hardware components.

Step 1: The burst assembly unit (103) assembles the input signal (IP packets, etc.) into individual bursts based on the destination information for each packet. The assembly time is denoted as $t_a$ (503). If timer-based assembly scheme is used, the assembly time for in all transmitters is fixed at a preset value T (i.e. $t_a$=T). The selection of this value will be discussed later.

Step 2: At the end of this assembly period, the burst information is sent to the centralized controller (504, same as 301 in FIG. 7). There is a propagation delay of $t_i$ (505), which should be quite short due to the short physical distance within the data center.

Step 3: When the centralized controller receives the burst information from all transmitters in the entire DCN (they should arrive at about the same time, due to the clock synchronization and the short transmission distance), it uses some algorithm to generate the wavelength and subcarrier assignment for each WDM OFDM channel based on the global traffic demand information. In our previous published work, several algorithms have been proposed and analyzed [Ji2]. For example, the Most Subcarrier First (MSF) heuristic algorithm is shown to deliver good resource utilization while having low complexity (thus requiring only short computation time). Overall the subcarrier allocation for this DCN architecture does not require high algorithmic complexity, because each destination (receiver) can be considered independently, as analyzed in [Ji2, Ji3]. This computation time is denoted as $t_p$ (506). It is related to the algorithm and the computation power of the processor.

Step 4: The results are then sent back to the transmitters, the propagation delay should be the same (i.e. $t_i$) because of the same physical path. During Steps 2-4, the data bursts are put in a delay (120, 121). The amount of delay (D) is set to be the return path propagation delay and the control processing time, i.e. $D=2 \times t_i + t_p$.

Step 5: When the transmitter receives this information, the optical burst also arrives the OFDM modulator (112, 113) after the delay period of D. The transmitter then configures the individual OFDM modulators to generate OFDM signals on assigned subcarriers, and at the same time configures the individual lasers (turn them on/off, or tune the wavelength) inside the EO converters (116, 117) according to instruction from the controller. The total configuration time is denoted as $t_c$ (507). Its value is mainly determined by greater one between the computation power of the OFDM modulator and the laser configuration speed. At this step, all the WDM OFDM generator units (122, 123) are configured concurrently.

Step 6: The generated OFDM signals are modulated to optical signals to generate WDM OFDM signals. This duration is denoted as $t_m$ (508). This duration should be significantly shorter than $t_a$ (i.e. shorter than T), because: (1) At the burst assembly, all the signals from the ToR arrived sequentially. But at this stage, the signals are distributed to respective WDM OFDM generator units (122, 123) to be processed in parallel, each of these generator units only contain and process a subset of the source data. (2) The input signal from the ToR is most likely to be in on-off keying modulation format, but during the OFDM modulation, higher level modulation formats (such as QPSK, 16QAM, 64QAM, etc.) can be used. (These advanced modulation schemes will not cause signal degradation due to the short transmission distance within the DCN. This has been demonstrated and confirmed in our experiment.) Therefore the time required for WDM OFDM signal modulation should be significantly shorter than the assembly time. Together, the WDM OFDM configuration time and modulation time form the WDM OFDM processing time P within the transmitter, i.e. $P=t_c+t_m$.

Step 7: The generated WDM OFDM signal is then sent to the CAWG optical core (302) and then transmitted to all related destination ToRs' receivers (209). This propagation time is denoted as $t_t$ (509). This should also be quite small due to the short distance in the DCN.

Step 8: At each destination receiver, the received WDM signals from all the transmitters are converted to baseband OFDM signal through a photodetector (204), which is then digitized and demodulated to recover the burst signals by the OFDM demodulator (206). The duration for this procedure is denoted as $t_r$ (510), which is mainly determined by the computation power of the OFDM demodulator. The value of $t_r$ should be comparable with $t_m$.

Step 9: The burst streams are then disassembled by a burst disassembly unit (208) into original traffic format (e.g. IP packets). This time is denoted as $t_d$ (511). Since the signal bandwidth from and to each ToR should be symmetric, it is reasonable to expect that $t_d \leq t_a = T$.

Figure 10:
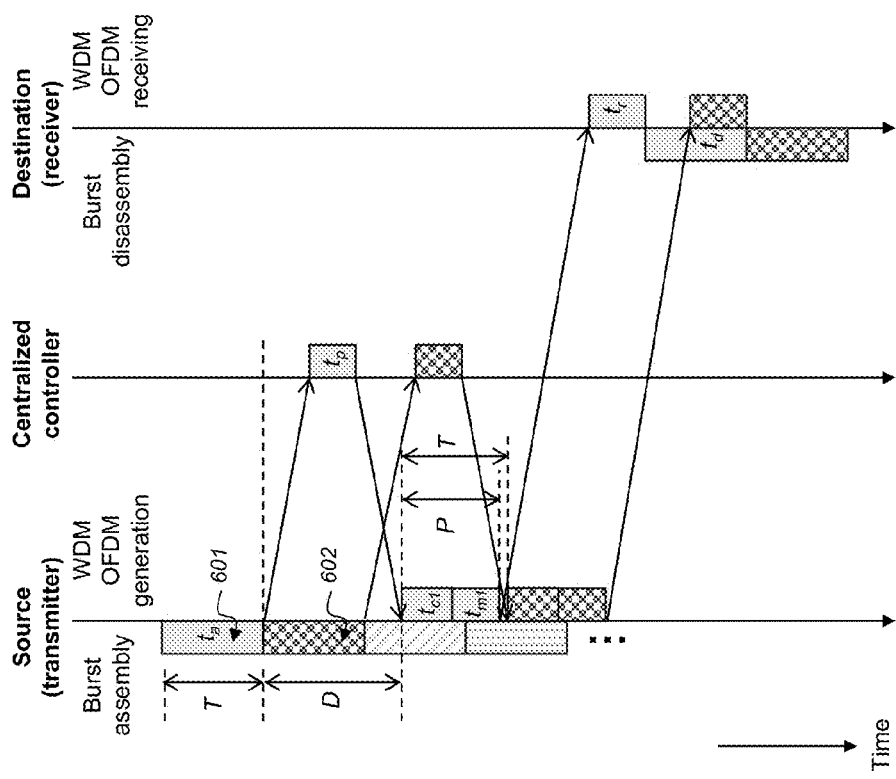
FIG. 10 is a scheduling diagram showing continuing burst handling without guard time, in accordance with the invention.

Right after the first burst (601, same as 502) is assembled at each transmitter during the first T period, the second burst (602) can be assembled in the next T period without guard time, as illustrated in FIG. 10. There are several possibilities that there might be resource collision during this process, but they can all be avoided if appropriate T timing value is set and the hardware has fast enough speed. Below are the analysis:

The first possible location of resource schedule collision is at the centralized controller if $t_p$ exceeds T. This means that when the second burst's information arrives the centralized controller, the controller has not completed the wavelength and subcarrier resource allocation computation yet. This can be avoided by setting T larger than $t_p$. In fact, this condition is not likely to occur because the centralized controller in a DCN usually has high computation power and can perform the resource allocation within very short time, especially since the resource allocation in this DCN is not complex (as discussed earlier) and efficient algorithm can be employed.

The second possible collision occurs at the WDM OFDM generator unit if P is greater than T. This means that the first burst has not been converted into WDM OFDM signal and left the transmitter before the second burst arrives. It is possible to avoid this situation because the $t_m$ portion of P is shorter than T, as discussed earlier. The critical parameter is the WDM OFDM generator unit's configuration time $t_c$, which is mainly determined by the laser tuning or on/off speed (the OFDM modulator's subcarrier configuration is usually faster). Therefore it is important to estimate $t_c$ value, and set T larger than P.

The third possible collision occurs at the receiver if the OFDM demodulation time $t_r$ exceeds T (the EO conversion time at the photodetector is negligible). However this is not likely, because T is set to be greater than P, which is greater than $t_m$, and since $t_m$ and $t_r$ are similar.

The final possible collision occurs at the receiver's burst disassembly unit if $t_d$ exceeds T. But as discussed earlier, $t_d$ is always shorter than or equal to T.

Based on the analysis above, the main consideration to avoid collision without guard time between adjacent bursts is to know the laser tuning/setting speed and then to set T large enough to exceed P.

Another factor for setting the T value is the OFDM subcarrier granularity, since the optical bursts are packed in OFDM signal format during the transmission, where the minimum unit is one OFDM subcarrier. If the maximum data volume in a burst is less than the capacity of an OFDM subcarrier, the DCN's bandwidth resource cannot be fully utilized. Therefore the T value should be set large enough to fully utilize the subcarrier capacity. (In our previous experiment, the capacity carried by each OFDM subcarrier is as low as 10 Mb/s. Even lower per-subcarrier capacity can also be easily achieved.)

On the other hand, setting T too large will lower the potential statistical multiplexing gain because it will lead to lower average utilization rate in each burst. Therefore setting appropriate T value is important for the DCN's efficiency.

It should be noted that the selection of T is independent of the delay value D. In other words, even if the transmission path between the ToR and the centralized controller is long and $t_l$ is large, the no-guard-time feature can still hold, as shown in the example on FIG. 10, where D is higher than T and still no guard time is required.

In cases that there is too much traffic from multiple source ToRs to be sent to a single destination ToR, contention will occur. This is the same for any types of DCN architecture or technology. In this MIMO OFDM architecture, this means that at this particular time period, there are no sufficient OFDM subcarriers to carry all the traffics from all input transmitters, i.e. all the subcarriers for this certain destination ToR are assigned and used, and the receiver is working at the maximum capacity, but still cannot accommodate all the incoming requests. When such contention occurs, some input traffic will be dropped, or be sent to the ToR's buffer to be transmitted later, or be switched to some spare port for delayed transmission, etc. The selection of which ToR transmitter's traffic (or which server's traffic, or which type of traffic) to be dropped and which to be passed will be determined by the centralized controller, following some pre-set guidelines such as different priorities for different traffic classes, or for different burst sizes, etc.

This control procedure described above is a modified OBS control procedure. Comparing with the conventional OBS switching, it has the following similarities:
  Steps: burst assembling at the edge, then burst reservation, then burst routing/switching
  Separation of control and data signals
  The use of pre-determined delay to wait for the control signal processing
  Benefits of statistical multiplexing at the network edge
  The bursts are client protocol and format independent
  Not requiring buffer in the network
However there are several key differences:
  The data transmission in our architecture only has 1 hop (even though it can also be considered as 2 hops: source transmitter=>CAWG=>destination receiver, it is essentially one hope because the CAWG core is passive, and the wavelength/fiber paths between all source-destination pairs are different and parallel). On the contrary, the transmission in the conventional OBS network has multiple hops, and the number of hops varies among different source-destination pairs.
  There is no intermediate node, therefore burst forwarding at the intermediate node is not required.
  In this DCN application, the transmission distance between source and destination is short. Also the control information is simple. These 2 features allow the control signals to be sent electrically and not requiring separate optical channel for control signals, reducing OE and EO component cost.
  No guard time is required in this architecture, as discussed above. On the contrary, guard time is usually required for conventional OBS network.
  It is possible/easy to share the system clock signal for synchronization among all nodes (ToRs in this case), this is another benefit of the short transmission distance.
  The burst assembly unit has multiple outputs. The bursts for different destinations are processed in separate parallel hardware units and form separate channels at the transmitter.

(III) Software-Defined DCN Architecture

In the current communications networks, hardware components are manufactured by different vendors and have closed and proprietary interfaces, and there are many different distributed protocols operating simultaneously. As a result, the networks are becoming exceedingly complex. This makes the network management, customization and optimization very difficult, and prevents innovations to be developed, because it is almost impossible for researchers to test and implement new technologies easily. Therefore, the network operators face high capital expense (CAPEX) and high operation expense (OPEX), researchers lose motivation to continuing the innovations, and the customers cannot receive service quality improvement at reasonable price.

Recently software-defined network (SDN) has been studied intensively. It provides a new networking approach to solve such problems. Its key attributes include: separation of data and control planes, a uniform vendor-agnostic interface between control and data planes, a logically centralized control plane, and slicing and virtualization of the underlying network. OpenFlow has been developed as the common open interface. A network operating system, which forms the logically centralized control plane, constructs and presents a logical map of the entire network to services or control applications implemented on top of it. Such information and common interface allow the network operators to implement new features by writing simple network-independent software program to manipulate the logical map of a network slice of the network.

Similar concept has been proposed on optical networks. FIG. 11 is shows an example structure of a software-defined optical network (SDON) for optical transport [Ji4]. Similar to SDN for packet-switched IP network, the SDON for optical transport has the features of:

- The network controller (also called the optics-defining software or ODS) and the physical transmission/switching system (also called the software-defined optics or SDO) are separated.
- These two planes are connected via a common open interface (such as OpenFlow with extension for circuit switching).
- Most network control and management intelligence will reside in a centralized controller.
- The physical hardware will offer high level of flexibility to support different network demands and conditions.

In this invention, we extend such structure to the proposed DCN architecture. FIG. 12 shows the software-defined DCN control architecture. It can also be divided into 3 major sections, the physical hardware (SDO, 701) at the lowest layer, the network controller (ODS, 702) at the upper layer, and a common open interface (703) in between.

The physical hardware includes the software controllable/reconfigurable flexible transmitter, receiver and switches. In the MIMO OFDM DCN architecture, it includes the WDM OFDM optical burst transmitters (704, same as 126 and 501) and the WDM OFDM optical burst receivers (705, same as 209 and 502). Since the optical core, i.e. the CAWG, is completely passive and does not require any control, it is not shown in the SDO section here. Each of these SDO hardware has an adapter (e.g. 706, 707) to interpret the commands between the open interface commands (such as OpenFlow commands) and the hardware-specific control commands or signals. Benefit from the software controllable flexibility provided by these hardware (e g tuning to different wavelength, using different subcarriers, and applying different modulation schemes), the physical network can be configured for different traffic conditions and can perform different functions.

The network controller includes sub-layer elements such as network hypervisor (708), operating system (709), network applications (710) and debugger/manager (711). Since the network architecture is very simple (single hop point-to-point) and does not require much virtualization, the network hypervisor is not necessarily required. The operating system and the debugger/manager perform the same task as in other SDON or SDN. In the network applications section, the main application is to perform the wavelength and subcarrier allocation. As discussed earlier, different algorithms and schemes can be used here. This provides the ability for the network operator to test and implement different technologies flexibly without touching the physical software, which is a key benefit of software-defined architecture. If needed, other applications, such as network status and performance monitoring, protection, can be also implemented without directly modifying the hardware.

For the common open interface between these 2 layers, different solutions can be made. OpenFlow is one option since it is a popular technology for the existing SDN implementations, including multiple DCN systems. To apply OpenFlow protocol in this MIMO OFDM DCN architecture, some modifications need to be done. For example, the concept of a "flow" is now the OFDM subcarrier-based burst, the flow identifier for the flow table needs to include fields for OFDM subcarrier information, and it is time synchronized, etc. For the burst information control signal from the transmitter to the centralized controller, each burst identifier needs to contain at least the entries for ToR_source, ToR_destination, and burst size information, with optional fields such as priority class. For the returned signal from the centralized controller, it needs to contain at least the entries for the ToR_source, wavelength, subcarrier_from, subcarrier_to (or subcarrier_number), signal_type, etc.

With this software-defined architecture, if the WDM OFDM optical burst transmitter or receiver hardware is modified or upgraded in the future, the control software does not need to be changed and the same control commands can be used through the open interface. Similarly, if the network operator wants to change the control scheme or apply new features, it does not need to physically modify the hardware but only need to apply new software.

From the foregoing it can be appreciated that the features and benefits of the provide an efficient procedure to utilize the MIMO-OFDM DCN architecture; make use of the advantages of OBS and allows practical switching of packets, and it does not have the scalability, in-service upgradability and non-uniform latency issues in the OPST technology.

The invention provides the data center operators a practical way to operate a DCN with high capacity, excellent flexibility, low latency, low energy consumption and low cost. In particular, the enabled packet switching capability leads to better utilization of network resources (such as bandwidth and ports). This also simplifies the network control because many switching layers between the IP router and the physical optical hardware can be bypassed or eliminated. Furthermore, it provides the benefit of software-defined network that allows the network operator the flexibility to reconfigure the network and apply different control schemes without changing physical hardware.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A communication system enabling a switching procedure for a multiple-input multiple-output orthogonal frequency division multiplexing (MIMO OFDM) based flexible rate intra-data center network DCN, the system comprising:
   a MIMO OFDM DCN with optical burst switching (OBS) capability;
   a modified OBS control means for burst assembling, wavelength division multiplexing WDM OFDM signal generating, and MIMO OFDM DCN controlling;
   a software defined network (SDN) architecture;
   wherein a centralized controller coupled to the MIMO OFDM DCN, and the MIMO OFDM DCN provides optical burst handling functions to allow efficient sub-wavelength level switching of packets, and add the communication channels with the centralized controller, the modified OBS means providing burst assembling and WDM OFDM signal generation that are operable concurrently not on the same signal; and the software defined network SDN architecture determines if upgrade is available, if the WDM OFDM generation hardware is modified or upgraded in the future, the control software does not need to be changed and the same control commands can be used through the open interface and network operator changes to control by the SDN capability or apply new features, only new software need be applied without hardware modification.

2. The system of claim 1, wherein the MIMO OFDM DCN comprises a WDM OFDM optical burst transmitter with a burst assembly unit that is destination specific and can handle multiple destinations simultaneously.

3. The system of claim 2, wherein the optical burst assembly unit outputs multiple burst data streams, one for each destination rack, based on targeted destination information for each packet, the destination-specific burst assembly unit sends it to the respective output, and at each output, the burst assembly unit assembles the packets arrived within the assembly cycle time into a burst where all packets arrived within the cycle time are assembled into a burst with only those sent to the same destination racks being assembled into a burst.

4. The system of claim 2, wherein the MIMO OFDM DCN comprises hardware being performable in-service without affecting existing traffics in the network.

5. The system of claim 2, wherein the MIMO OFDM DCN has a latency that is low and uniform with all signals taking exactly one hop.

6. The system of claim 1, wherein the MIMO OFDM DCN enables obtained data contents that are signal bursts from various source top-of-racks ToRs for a destination ToR., and these bursts then pass through a source specific burst disassembly unit to disassemble the bursts back to original traffic content.

7. The system of claim 1, wherein the optical burst switching OBS procedure comprises processing burst switching without requiring a guard time by setting the appropriate assemble time value and by distributing input data into multiple parallel burst streams and using higher level modulation formats in the OFDM subcarriers.

8. The system of claim 1, wherein the optical burst switching OBS procedure comprises setting an appropriate assemble time value that must be larger than a centralized controller's planning time, must be larger than the WDM OFDM signal generation time, must be larger than an OFDM demodulation time, prefer to be larger than the capacity of a single OFDM subcarrier, and should not be so large that it will reduce the statistical multiplexing gain.

9. The system of claim 1, wherein the software defined network SDN configuration comprises an extension of OpenFlow for the MIMO OFDM DCN, including flow identifier modification to include subcarrier information.

10. The system of claim 1, wherein the software defined network SDN configuration comprises a physical hardware at a lowest layer, a network controller at an upper layer, and a common open interface in between, the physical hardware including software controllable/configurable transmitter, receiver and switches, the network controller including sub-layer elements of a network hypervisor, operating system, network applications and debugger/manager, and the common open interface including an OpenFlow protocol.

11. A method in a communication system for enabling a switching procedure for a multiple-input multiple-output orthogonal frequency division multiplexing (MIMO OFDM) based flexible rate intra-data center network DCN, the method comprising:
   providing optical burst switching (OBS) capability with a MIMO OFDM DCN;
   a modified OBS control steps for burst assembling, wavelength division multiplexing WDM OFDM signal generating, and MIMO OFDM DCN controlling; and
   enabling a software defined network SDN configuration in the communication system with a centralized control configuration coupled to the MIMO OFDM DCN;
   wherein the MIMO OFDM DCN provides optical burst handling functions to allow efficient sub-wavelength level switching of packets, and add the communication channels with the centralized controller, the modified OBS steps providing burst assembling and WDM OFDM signal generation that are operable concurrently not on the same signal; and the software defined network SDN configuration determines if upgrade is available, if the WDM OFDM generation hardware is modified or upgraded in the future, the control software does not need to be changed and the same control commands can be used through the open interface and network operator changes to control by the SDN capability or apply new features, only new software need be applied without hardware modification.

12. The method of claim 11, wherein the MIMO OFDM DCN comprises a WDM OFDM optical burst transmitter with a burst assembly unit that is destination specific and can handle multiple destinations simultaneously.

13. The method of claim 12, wherein the optical burst assembly unit outputs multiple burst data streams, one for each destination rack, based on targeted destination information for each packet, the destination-specific burst assembly unit sends it to the respective output, and at each output, the burst assembly unit assembles the packets arrived within the assembly cycle time into a burst where all packets arrived within the cycle time are assembled into a burst with only those sent to the same destination racks being assembled into a burst.

14. The method of claim 12, comprising changing the hardware being performable in-service without affecting existing traffics in the network.

15. The method of claim 12, wherein the MIMO OFDM DCN has a latency that is low and uniform with all signals taking exactly one hop.

16. The method of claim 11, wherein the MIMO OFDM DCN enables obtained data contents that are signal bursts from various source top-of-racks ToRs for a destination ToR., and these bursts then pass through a source specific burst disassembly unit to disassemble the bursts back to original traffic content.

17. The system of claim 11, wherein the optical burst switching OBS procedure comprises processing burst switching without requiring a guard time by setting the appropriate assemble time value and by distributing input data into multiple parallel burst streams and using higher level modulation formats in the OFDM subcarriers.

18. The method of claim 11, wherein the optical burst switching OBS procedure comprises setting an appropriate assemble time value that must be larger than a centralized controller's planning time, must be larger than the WDM OFDM signal generation time, must be larger than an OFDM demodulation time, prefer to be larger than the capacity of a single OFDM subcarrier, and should not be so large that it will reduce the statistical multiplexing gain.

19. The method of claim 11, wherein the software defined network SDN configuration comprises an extension of OpenFlow for the MIMO OFDM DCN, including flow identifier modification to include subcarrier information.

20. The method of claim 11, wherein the software defined network SDN configuration comprises a physical hardware at a lowest layer, a network controller at an upper layer, and a common open interface in between, the physical hardware including software controllable/configurable transmitter, receiver and switches, the network controller including sub-layer elements of a network hypervisor, operating system, network applications and debugger/manager, and the common open interface including an OpenFlow protocol.

* * * * *